May 27, 1941.  J. THOMSON  2,243,265
PIPE COUPLING
Filed Oct. 21, 1939
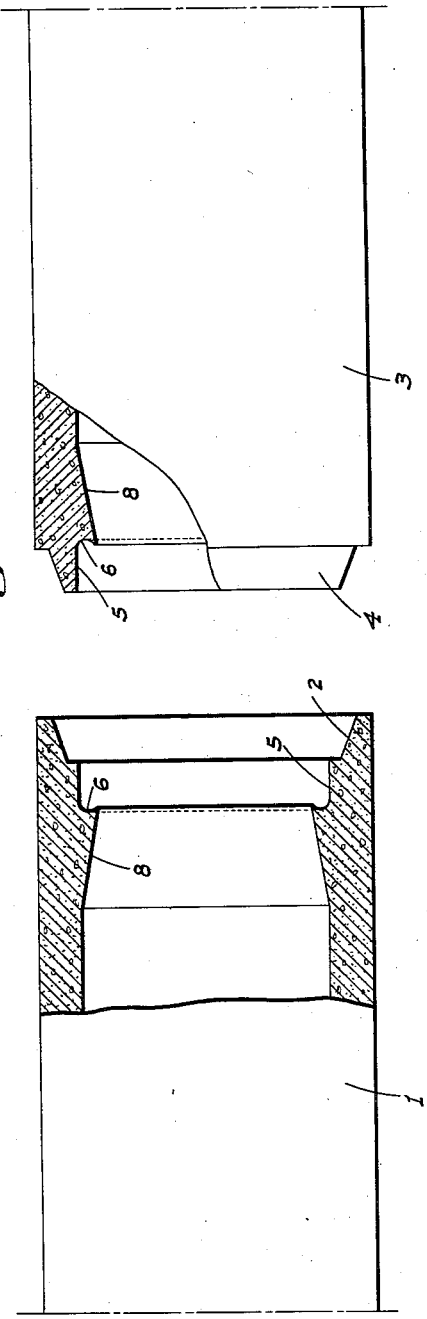
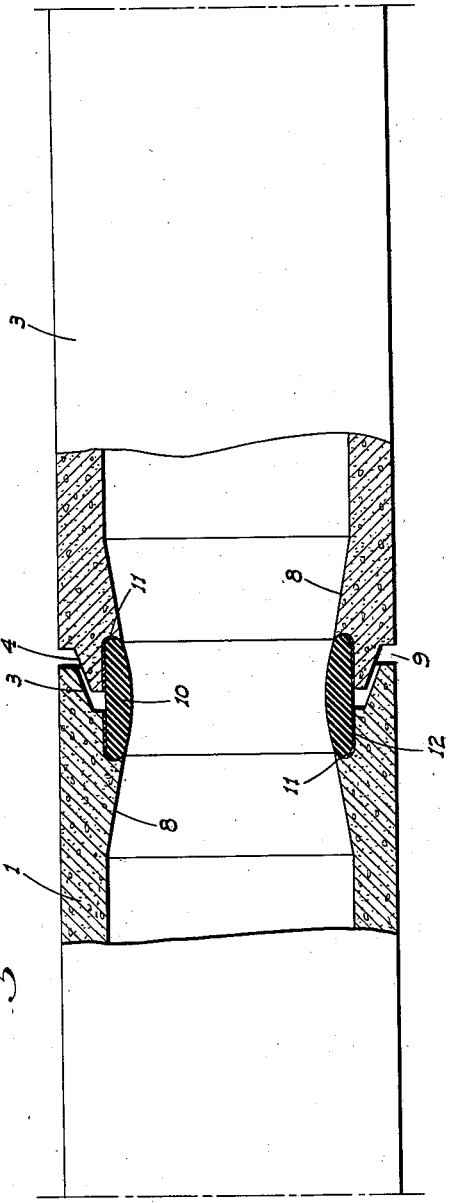
INVENTOR.
John Thomson
BY
ATTORNEY Patented May 27, 1941

2,243,265

UNITED STATES PATENT OFFICE 2,243,265

PIPE COUPLING

John Thomson, Chico, Calif., assignor to Valley Concrete Pipe & Products Company, Yuba City, Calif., a corporation of California Application October 21, 1939, Serial No. 300,615

2 Claims. (Cl. 285—197)

This invention relates in general to pipe couplings, and in particular the invention is directed to a coupling for concrete pipe sections or the like.

The principal object of this invention is to provide a unique coupling for connection between adjacent ends of counterseated pipe sections; the coupling being resilient and arranged to provide a positive seal, limited flexibility between adjacent pipe sections, and to compensate for expansion and contraction thereof.

Another object of the invention is to assure positive maintenance of the resilient coupling in place; this being accomplished by a novel configuration of the coupling and its seat.

An additional object of the invention is to provide a coupling, for adjacent ends of counterseated pipe sections, which—while being of sufficient thickness to prevent blowing out or rupturing thereof under relatively high pressure—is mounted so as to not interfere with free flow of the water through the pipe sections.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation partly in section of a pair of adjacent pipe sections with their ends separated and illustrating the coupling seat portions as embodied in each section.

Figure 2 is a side elevation partly in section illustrating the coupling as mounted between adjacent ends of counterseated pipe sections.

Referring now more particularly to the characters of reference on the drawing, the numeral 1 indicates a section of concrete pipe formed with a tapered annular socket or female portion 2 in the end thereof, while the numeral 3 indicates an adjacent concrete pipe section formed with a projecting annular male portion 4—all as is usual in counterseating pipe sections.

The adjacent ends of the pipe sections are each formed with an annular recess 5 disposed radially inward of the counterseating portions 2 and 4 and open to the interior as well as to the end of the corresponding section. When the sections are in cooperative position said recesses form, in effect, an inwardly opening annular channel.

The inner or adjacent faces of the sides of such channel are concave as at 6 for the purpose hereinafter set forth. The thickness of the pipe sections is increased radially inward, as at 7, in order to form the aforesaid recesses. As this somewhat reduces the internal diameter of the sections at such point, the increase in thickness is not abrupt, but increases gradually from a point longitudinally back in the pipe sections, whereby the reduction in internal diameter is on a gradual taper as at 8. The purpose of this taper is to assure a free flow of water through the pipe sections adjacent and at the counterseated ends thereof.

When the adjacent ends of adjacent pipe sections are counterseated, a relatively small space 9 is left between said ends and the included cooperating male and female portions 4 and 2. An annular coupling band 10 of relatively stiff but flexible and resilient material, preferably rubber, is seated in the channel formed by recesses 5. This coupling is of a width to snugly and symmetrically engage in the channel; the end edges 11 of the coupling being convex to correspond with and firmly engage in the concave sides 6 of the channel or recesses. By reason of this concave-convex arrangement, the coupling is better held in place.

To further assure against displacement of the coupling, a layer of cement 12 is applied between the coupling and the adjacent surfaces of recesses 5. The coupling is increased in thickness somewhat between its end edges as shown and to prevent any blow out through space 9, the increase being gradual from the ends toward the middle and practically forming continuations of tapers 8.

When pipe sections are arranged and connected with couplings as above described, a positive seal is had, and the flexible and resilient couplings permit of expansion and contraction of the pipe sections, and compensate for reasonable misalinement which may be caused by such facts as uneven terrain and upheaval or sinking of the terrain, without danger of fracturing the pipe.

If it is not essential that the exterior diameter of the pipe sections be the same from end to end, it will be obvious that the same results may be obtained by making the sections at adjacent ends thicker radially out from the bore of the sections, so that the bore of the resilient coupling band may be the same size as that of the pipe sections.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A coupling structure for the adjacent ends of a pair of pipe sections disposed in end to end alinement, said structure comprising overlapping male and female portions on the sections at said ends separated both axially and radially thereof and a band of resilient compressible material mounted in both sections radially inward of the overlapping portions and bridging the axial gap therebetween.

2. A coupling structure for the adjacent ends of a pair of pipe sections disposed in end to end alinement, said structure comprising overlapping male and female portions on the sections at said ends separated both axially and radially thereof and a band of resilient compressible material mounted in both sections radially inward of the overlapping portions and bridging the axial gap therebetween, the sections having annular recesses in their bores at said ends to receive the band in countersunk relation so that the bore of the band is substantially flush with the bore of the pipe sections.

JOHN THOMSON.